(12) United States Patent
Juneja

(10) Patent No.: US 10,225,762 B2
(45) Date of Patent: Mar. 5, 2019

(54) METHODS, SYSTEMS, AND COMPUTER READABLE MEDIA FOR MESSAGE FLOOD SUPPRESSION DURING ACCESS NODE-GATEWAY (AN-GW) UNAVAILABILITY AND AFTER AN-GW RESTORATION

(71) Applicant: Oracle International Corporation, Redwood Shores, CA (US)

(72) Inventor: Rohit Juneja, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 134 days.

(21) Appl. No.: 15/472,211

(22) Filed: Mar. 28, 2017

(65) Prior Publication Data

US 2018/0288648 A1    Oct. 4, 2018

(51) Int. Cl.
*H04W 4/00*       (2018.01)
*H04W 28/02*   (2009.01)
(Continued)

(52) U.S. Cl.
CPC ....... *H04W 28/0289* (2013.01); *H04W 24/04* (2013.01); *H04W 88/16* (2013.01)

(58) Field of Classification Search
CPC ......... H04W 28/0215; H04W 28/0247; H04W 28/0289; H04W 28/02
See application file for complete search history.

(56) References Cited

U.S. PATENT DOCUMENTS

| | | |
|---|---|---|
| 6,144,636 A | 11/2000 | Aimoto et al. |
| 8,305,922 B2 | 11/2012 | Cuervo |

(Continued)

FOREIGN PATENT DOCUMENTS

| | | |
|---|---|---|
| CN | 101841766 A | 9/2010 |
| CN | 102215469 A | 10/2011 |

(Continued)

OTHER PUBLICATIONS

Letter Regarding Notification to Grant in Chinese Patent Application No. ZL201380037292.X (dated Feb. 13, 2018).

(Continued)

*Primary Examiner* — Edan Orgad
*Assistant Examiner* — Nourali Mansoury
(74) *Attorney, Agent, or Firm* — Jenkins, Wilson, Taylor & Hunt, P.A.

(57) ABSTRACT

According to one aspect, the subject matter described herein includes a system for suppressing message flooding during access note-Gateway (AN-GW) unavailability and/or after AN-GW restoration. The system includes a network node including at least one processor and a memory. The network node includes an interface for receiving an indication of unavailability of an AN-GW. An AN-GW status maintainer maintains, in the memory, a node-level AN-GW status indicator indicating availability or unavailability of the AN-GW and setting the node-level AN-GW status indicator to unavailable in response to receiving the indication of unavailability of the AN-GW. An AN-GW status checker checks status of the AN-GW using the node-level AN-GW status indicator and suppresses, based on the status of the AN-GW determined from the node-level AN-GW status indicator, messaging for plural sessions involving the AN-GW.

8 Claims, 12 Drawing Sheets

(51) Int. Cl.
*H04W 24/04* (2009.01)
*H04W 88/16* (2009.01)

(56) References Cited

U.S. PATENT DOCUMENTS

| | | | |
|---|---|---|---|
| 8,326,263 B2 | 12/2012 | Zhou et al. | |
| 8,331,229 B1 | 12/2012 | Hu et al. | |
| 8,335,220 B2 | 12/2012 | Hu et al. | |
| 8,353,000 B2 | 1/2013 | He et al. | |
| 8,400,916 B2 | 3/2013 | Cutler et al. | |
| 8,406,137 B2 | 3/2013 | Siddam et al. | |
| 8,438,290 B2 | 5/2013 | Rui et al. | |
| 8,458,767 B2 | 6/2013 | Riley et al. | |
| 8,543,118 B1 | 9/2013 | Mangal et al. | |
| 8,577,329 B2 | 11/2013 | Momtahan et al. | |
| 8,605,583 B2 | 12/2013 | Cutler et al. | |
| 8,630,925 B2 | 1/2014 | Bystrom et al. | |
| 8,675,487 B2 | 3/2014 | Siddam et al. | |
| 8,681,622 B2 | 3/2014 | Chatterjee et al. | |
| 8,683,544 B2 | 3/2014 | Foottit et al. | |
| 8,787,174 B2 | 7/2014 | Riley et al. | |
| 8,818,327 B2 | 8/2014 | Shaikh | |
| 8,824,315 B2 | 9/2014 | Kokkinen et al. | |
| 9,106,769 B2* | 8/2015 | Kanode | H04L 43/16 |
| 9,154,998 B2 | 10/2015 | Zhu et al. | |
| 9,166,803 B2 | 10/2015 | Riley et al. | |
| 9,369,910 B2 | 6/2016 | Rajagopalan et al. | |
| 9,537,775 B2* | 1/2017 | McMurry | H04L 47/127 |
| 9,699,045 B2* | 7/2017 | Roach | H04L 43/08 |
| 9,860,390 B2 | 1/2018 | Terrien et al. | |
| 10,027,760 B2* | 7/2018 | Renzullo | H04L 67/14 |
| 2003/0003928 A1 | 1/2003 | Marjelund et al. | |
| 2004/0116117 A1 | 6/2004 | Ahvonen et al. | |
| 2005/0013423 A1 | 1/2005 | Eversen et al. | |
| 2005/0107091 A1 | 5/2005 | Vannithamby et al. | |
| 2005/0195743 A1 | 9/2005 | Rochberger et al. | |
| 2007/0153995 A1 | 7/2007 | Fang et al. | |
| 2007/0195788 A1 | 8/2007 | Vasamsetti et al. | |
| 2007/0232301 A1 | 10/2007 | Kueh | |
| 2007/0259673 A1 | 11/2007 | Willars et al. | |
| 2008/0046963 A1 | 2/2008 | Grayson et al. | |
| 2009/0104945 A1 | 4/2009 | Andreasen et al. | |
| 2009/0141625 A1 | 6/2009 | Ghai et al. | |
| 2009/0185494 A1 | 7/2009 | Li et al. | |
| 2009/0207730 A1 | 8/2009 | Stamoulis et al. | |
| 2009/0219946 A1 | 9/2009 | Liu et al. | |
| 2009/0270099 A1 | 10/2009 | Gallagher et al. | |
| 2010/0048161 A1 | 2/2010 | He et al. | |
| 2010/0091671 A1 | 4/2010 | Lidstrom et al. | |
| 2010/0188975 A1 | 7/2010 | Raleigh | |
| 2010/0192170 A1 | 7/2010 | Raleigh | |
| 2010/0284278 A1 | 11/2010 | Alanara | |
| 2010/0287121 A1 | 11/2010 | Li et al. | |
| 2010/0299451 A1 | 11/2010 | Yigang et al. | |
| 2011/0035495 A1 | 2/2011 | Ekström et al. | |
| 2011/0067085 A1 | 3/2011 | Brouard et al. | |
| 2011/0076985 A1 | 3/2011 | Chami et al. | |
| 2011/0122886 A1 | 5/2011 | Willars et al. | |
| 2011/0138066 A1 | 6/2011 | Kopplin et al. | |
| 2011/0165901 A1 | 7/2011 | Baniel et al. | |
| 2011/0171958 A1 | 7/2011 | Hua et al. | |
| 2011/0199903 A1 | 8/2011 | Cuervo | |
| 2011/0217979 A1* | 9/2011 | Nas | H04W 4/00 455/433 |
| 2011/0219426 A1 | 9/2011 | Kim et al. | |
| 2011/0225306 A1 | 9/2011 | Delsesto et al. | |
| 2011/0299395 A1 | 12/2011 | Mariblanca Nieves | |
| 2011/0307790 A1 | 12/2011 | Pandya et al. | |
| 2011/0314145 A1 | 12/2011 | Raleigh et al. | |
| 2011/0317557 A1 | 12/2011 | Siddam et al. | |
| 2011/0317571 A1 | 12/2011 | Kokkinen et al. | |
| 2012/0008544 A1 | 1/2012 | Nakagawa et al. | |
| 2012/0014332 A1 | 1/2012 | Smith et al. | |
| 2012/0039175 A1 | 2/2012 | Sridhar et al. | |
| 2012/0044867 A1 | 2/2012 | Faccin et al. | |
| 2012/0052866 A1 | 3/2012 | Froehlich et al. | |
| 2012/0087368 A1 | 4/2012 | Kunarathnam et al. | |
| 2012/0096177 A1 | 4/2012 | Rasanen | |
| 2012/0099715 A1 | 4/2012 | Ravishankar et al. | |
| 2012/0140632 A1 | 6/2012 | Norp et al. | |
| 2012/0155389 A1 | 6/2012 | McNamee et al. | |
| 2012/0176894 A1 | 7/2012 | Cai et al. | |
| 2012/0203781 A1 | 8/2012 | Wakefield | |
| 2012/0210003 A1* | 8/2012 | Castro | H04L 12/14 709/225 |
| 2012/0213072 A1 | 8/2012 | Kotecha et al. | |
| 2012/0221445 A1 | 8/2012 | Sharma | |
| 2012/0221693 A1 | 8/2012 | Cutler et al. | |
| 2012/0250573 A1 | 10/2012 | Kulasingam et al. | |
| 2012/0250613 A1 | 10/2012 | Robinson et al. | |
| 2012/0290452 A1 | 11/2012 | Pancorbo Marcos et al. | |
| 2012/0303796 A1 | 11/2012 | Mo et al. | |
| 2013/0044596 A1 | 2/2013 | Zhi et al. | |
| 2013/0070594 A1 | 3/2013 | Garcia Martin et al. | |
| 2013/0079006 A1 | 3/2013 | Cho et al. | |
| 2013/0114404 A1 | 5/2013 | Yang | |
| 2013/0142042 A1 | 6/2013 | Garcia Martin et al. | |
| 2013/0160058 A1 | 6/2013 | Albal et al. | |
| 2013/0163429 A1 | 6/2013 | Dunstan et al. | |
| 2013/0177146 A1 | 7/2013 | Schneider et al. | |
| 2013/0235736 A1* | 9/2013 | Khadri | H04L 43/10 370/250 |
| 2013/0250838 A1* | 9/2013 | Liang | H04W 4/08 370/312 |
| 2013/0265911 A1 | 10/2013 | Kulaingam et al. | |
| 2014/0011512 A1* | 1/2014 | Hu | H04L 12/1407 455/452.2 |
| 2014/0022897 A1 | 1/2014 | Rajagopalan et al. | |
| 2014/0031029 A1 | 1/2014 | Rajagopalan et al. | |
| 2014/0040975 A1 | 2/2014 | Raleigh et al. | |
| 2015/0011182 A1 | 1/2015 | Goldner et al. | |
| 2016/0359947 A1* | 12/2016 | Rao | H04L 67/025 |
| 2016/0373589 A1* | 12/2016 | Chai | H04L 12/1407 |
| 2017/0019750 A1 | 1/2017 | Palanisamy et al. | |
| 2017/0280270 A1* | 9/2017 | Kim | H04W 24/04 |
| 2017/0317904 A1* | 11/2017 | Rasanen | H04W 28/0205 |

FOREIGN PATENT DOCUMENTS

| | | |
|---|---|---|
| CN | 102223663 A | 10/2011 |
| CN | ZL201080004945.X | 11/2015 |
| CN | ZL 201410643664.X | 12/2017 |
| CN | 104471974 B | 4/2018 |
| EP | 0 857 399 B1 | 5/2004 |
| EP | 1 988 680 A1 | 11/2008 |
| EP | 2 093 931 A1 | 8/2009 |
| EP | 2 509 357 A1 | 10/2012 |
| EP | 2 555 562 A1 | 2/2013 |
| EP | 2 520 045 B1 | 7/2015 |
| EP | 2 875 662 B1 | 12/2017 |
| EP | 2 873 268 B1 | 1/2018 |
| JP | A-3-270398 | 12/1991 |
| JP | 10-23509 | 1/1998 |
| JP | 2000-125341 | 4/2000 |
| JP | 2001-054164 A | 2/2001 |
| JP | 2006-518972 A | 8/2006 |
| JP | 2013540380 A | 10/2013 |
| WO | WO 2009/039204 A2 | 3/2009 |
| WO | WO 2009/049684 A1 | 4/2009 |
| WO | WO 2009/058067 A1 | 5/2009 |
| WO | WO 2009/149341 A2 | 12/2009 |
| WO | WO 2011/082035 A2 | 7/2011 |
| WO | WO 2011/120229 A1 | 10/2011 |
| WO | WO 2012/001221 A1 | 1/2012 |
| WO | WO 2012/083795 A1 | 6/2012 |
| WO | WO 2013/030659 A1 | 3/2013 |
| WO | WO 2014/014829 A1 | 1/2014 |
| WO | WO 2014/015331 A1 | 1/2014 |

OTHER PUBLICATIONS

Pre-Appeal Re-Examination Report for Japanese Patent Application No. 2015-521880 (dated Jan. 16, 2018).

(56) References Cited

OTHER PUBLICATIONS

Letter Regarding Official Notice for Japanese Patent Application No. 2015-521880 (Jan. 23, 2018).
Decision to grant a European patent pursuant to Article 97(1) EPC for European Application No. 13820508.3 (dated Dec. 21, 2017).
Non-Final Office Action for U.S. Appl. No. 13/947,314 (dated Dec. 14, 2017).
Decision to grant a European patent pursuant to Article 97(1) EPC for European Application No. 13819435.2 (dated Nov. 30, 2017).
Second Office Action for Japanese Patent Application No. 2015-523302 (dated Oct. 24, 2017).
Notification of the First Office Action for Chinese Patent Application No. 201380038255.0 (dated Sep. 29, 2017).
Final Office Action for U.S. Appl. No. 13/947,314 (dated Sep. 28, 2017).
Letter Regarding Office Action for Japanese Patent Application No. 2015-521880 (dated Sep. 12, 2017).
Applicant-Initiated Interview Summary for U.S. Appl. No. 13/947,314 (dated Aug. 30, 2017).
Communication under Rule 71(3) EPC for European Application No. 13 820 508.3 (dated Aug. 24, 2017).
Notice of Allowance and Fee(s) Due for U.S. Appl. No. 13/572,132 (dated Aug. 22, 2017).
Notification of the First Office Action for Chinese Application No. 201380037292.X (dated Aug. 18, 2017).
Non-Final Office Action for U.S. Appl. No. 13/947,314 (dated May 16, 2017).
Applicant-Initiated Interview Summary for U.S. Appl. No. 13/572,132 (dated May 3, 2017).
Letter Regarding Office Action for Japanese Patent Application No. 2015-521880 (dated Mar. 21, 2017).
Letter Regarding Office Action for Japanese Patent Application No. 2015-523302 (dated Mar. 14, 2017).
Advisory Action for U.S. Appl. No. 13/947,314 (dated Feb. 10, 2017).
Communication pursuant to Article 94(3) EPC for European Patent Application No. 13 820 508.3 (dated Feb. 9, 2017).
Non-Final Office Action for U.S. Appl. No. 13/572,132 (dated Dec. 30, 2016).
Final Office Action for U.S. Appl. No. 13/947,314 (dated Nov. 25, 2016).
Communication pursuant to Article 94(3) EPC for European Patent Application No. 13 820 508.3 (dated Nov. 9, 2016).
Advisory Action Before the Filing of an Appeal Brief for U.S. Appl. No. 13/572,132 (dated Sep. 22, 2016).
Non-Final Office Action for U.S. Appl. No. 13/947,314 (dated Jun. 24, 2016).
Final Office Action for U.S. Appl. No. 13/572,132 (dated Jun. 16, 2016).
Applicant-Initiated Interview Summary for U.S. Appl. No. 13/572,132 (dated Mar. 1, 2016).
Extended European Search Report for European Application No. 13819435.2 (dated Feb. 9, 2016).
Notice of Allowance and Fee(s) Due for U.S. Appl. No. 13/942,323 (dated Feb. 5, 2016).
Extended European Search Report for European Application No. 13820508.3 (dated Feb. 3, 2016).
Advisory Action, Applicant-Initiated Interview Summary, & AFCP 2.0 Decision for U.S. Appl. No. 13/947,314 (dated Dec. 3, 2015).
Non-Final Office Action for U.S. Appl. No. 13/572,132 (dated Nov. 27, 2015).
Advisory Action & AFCP 2.0 Decision for U.S. Appl. No. 13/942,323 (dated Oct. 5, 2015).
Letter Regarding Decision to Grant for Chinese Patent Application No. 201080064945.X (dated Sep. 1, 2015).
Final Office Action and Applicant-Initiated Interview Summary for U.S. Appl. No. 13/947,314 (dated Jul. 16, 2015).
Final Office Action for U.S. Appl. No. 13/942,323 (dated Jun. 9, 2015).
Advisory Action Before the Filing of Appeal Brief and AFCP 2.0 Decision for U.S. Appl. No. 13/572,132 (dated Jun. 4, 2015).
Communication under Rule 71(3) EPC for European Patent Application No. 10841576.1 (dated May 7, 2015).
Applicant-Initiated Interview Summary for U.S. Appl. No. 13/572,132 (dated Apr. 29, 2015).
Communication of European Publication Number and Information on the Application of Article 67(3) EPC for European Patent Application No. 13820508.3 (dated Apr. 22, 2015).
Notification of the Second Office Action for Chinese Patent Application No. 201080064945.X (dated Apr. 22, 2015).
Notice of Allowance and Fee(s) Due and Interview Summary for U.S. Appl. No. 13/572,156 (dated Apr. 6, 2015).
Final Office Action for U.S. Appl. No. 13/572,132 (dated Mar. 11, 2015).
Non-Final Office Action for U.S. Appl. No. 13/942,323 (dated Feb. 25, 2015).
Non-Final Office Action for U.S. Appl. No. 13/947,314 (dated Jan. 16, 2015).
Final Office Action for U.S. Appl. No. 13/572,156 (dated Dec. 29, 2014).
First Office Action for Chinese Application No. 201080064945.X (dated Sep. 17, 2014).
Non-Final Office Action for U.S. Appl. No. 13/572,132 (dated Aug. 11, 2014).
Non-Final Office Action for U.S. Appl. No. 13/572,156 (dated May 23, 2014).
European Search Report for European Patent Application No. 10841576.1 (dated May 9, 2014).
Notice of Allowance and Fee(s) Due for U.S. Appl. No. 12/973,228 (dated Mar. 20, 2014).
Notification of Transmittal of the International Search Report and the Written Opinion of the International Searching Authority, or the Declaration for International Application No. PCT/US2013/050512 (dated Dec. 2, 2013).
"Policy on the Mobile: New Use Cases that Optimize Devices for the Network and Generate Revenue," An Oracle White Paper, pp. 1-15 (Dec. 2013).
Notice of Allowance and Fee(s) Due for U.S. Appl. No. 13/330,086 (dated Nov. 6, 2013).
Notification of Transmittal of the International Search Report and the Written Opinion of the International Searching Authority, or the Declaration for International Application No. PCT/US2013/051447 (dated Oct. 28, 2013).
Non-Final Office Action for U.S. Appl. No. 12/973,228 (dated Oct. 25, 2013).
Final Office Action for U.S. Appl. No. 12/973,228 (dated Jun. 21, 2013).
"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12.1.0, pp. 1-68 (Jun. 2013).
Non-Final Office Action for U.S. Appl. No. 12/973,228 (dated Feb. 1, 2013).
Communication of European Publication Number and Information on the Application of Article 67(3) EPC for European Patent Application No. 10841576.1 (dated Oct. 10, 2012).
"Digital cellular telecommunications systems (Phase 2+); Universal Mobile Telecommunications System (UMTS); LTE; Policy and charging control architecture (3GPP TS 23.203 version 8.14.0 Release 8)," ETSI TS 123 203, pp. 1-118 (Jul. 2012).
Notification of Transmittal of the International Search Report and the Written Opinion of the International Searching Authority, or the Declaration for International Patent Application No. PCT/US2010/061586 (dated Sep. 26, 2011).
Tekelec et al., "Discussion paper on Usage-reporting from PCRF to OCS over Sy," 3GPP TSG SA WG2 #86, pp. 1-2 (Jul. 11-15, 2011).
"Smart Cards; Card Application Toolkit (CAT) (Release 9)," ETSI TS 102 223 V9.2.0, pp. 1-209 (Oct. 2010).

(56) References Cited

OTHER PUBLICATIONS

3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).
3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).
3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).
3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).
"Universal Mobile Telecommunications System (UMTS); LTE; Policy and Charging Control over Gx Reference Point (3GPP TS 29.212 version 9.2.0 Release 9)," ETSI TS 129 212 V9.2.0, pp. 1-115 (Apr. 2010).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
Calhoun et al., "Diameter Base Protocol," RFC 3588, pp. 1-147 (Sep. 2003).
Interview Summary for U.S. Appl. No. 13/947,314 (dated Apr. 2, 2018).
Notification of Transmittal of the International Search Report and the Written Opinion of the International Searching Authority, or the Declaration for International Application No. PCT/US2018/024713 (dated Jun. 18, 2018).
Second Office Action for Chinese Application No. 201380038255.0 (dated May 25, 2018).
Final Office Action for Japanese Patent Application No. 2015-523302 (dated May 22, 2018).
ZTE, "Error handling when the PCC rule is removed due to the S-GW restoration support," 3GPP TSG-CT WG3 Meeting #74bis, Release 12, pp. 1-3 (Oct. 11, 2013).
"3rd Generation Partnership Project; Technical Specification Group Core Network and Terminals; Study of Evolved Packet Core (EPC) nodes restoration (Release 11)," 3GPP TR 23.857, V11.0.0, pp. 1-66 (Dec. 2012).
"Universal Mobile Telecommunications System (UMTS); LTE; Policy and Charging Control (PCC); Reference points," 3GPP TS 29.212 version 13.5.0 Release 13, pp. 1-258 (Apr. 2016).

* cited by examiner

METHODS, SYSTEMS, AND COMPUTER READABLE MEDIA FOR MESSAGE FLOOD SUPPRESSION DURING ACCESS NODE-GATEWAY (AN-GW) UNAVAILABILITY AND AFTER AN-GW RESTORATION

TECHNICAL FIELD

The subject matter described herein relates to reducing or preventing message flooding in mobile communications networks. More particularly, the subject matter described herein relates to suppressing message flooding between a policy and charging enforcement function (PCEF) or packet gateway (PGW) and a policy and charging rules function (PCRF) during AN-GW unavailability and after AN-GW restoration.

BACKGROUND

The AN-GW is the node in the mobile communications network through which user devices establish sessions with the network. In some instances, an AN-GW may handle hundreds or even thousands of user sessions. When an AN-GW goes down or becomes unavailable, there is currently no mechanism in the network for session-independent notification and handling of the AN-GW unavailability. As a result, when an AN-GW becomes unavailable, the PCEF must signal the PCRF individually for each session involving the unavailable AN-GW. Signaling the PCRF individually for each session involving the unavailable AN-GW is burdensome on the PCEF, the PCRF, and the intervening network. In addition, if the PCRF does not recognize the per-session AN-GW status information being conveyed by the PCEF, the PCRF may continue to send messages to the PCEF for the failed sessions, resulting in rejections from the PCEF. When the AN-GW is restored, per-session messaging is required to restore each session for which AN-GW unavailability was noticed. If the PCRF does not support the exchange of per-session AN-GW restoration information, multiple requests and responses may be sent between the PCEF and the PCRF with rejections from the PCEF. For example, when the PCEF does not support an AN-GW status attribute value pair (AVP), the PCEF drops all messaging towards the PCRF. The PCEF also rejects all messaging from the PCRF with UNABLE_TO_COMPLY (message code 5012). No AN-GW status information is shared.

Accordingly, there exists a need for methods, systems, and computer readable media for suppressing message flooding during AN-GW unavailability and after AN-GW restoration.

SUMMARY

The subject matter described herein includes methods, systems, and computer readable media for suppressing message flooding during AN-GW unavailability and after restoration. According to one aspect, the subject matter described herein includes a system for suppressing message flooding during access note-Gateway (AN-GW) unavailability and/or after AN-GW restoration. The system includes a network node including at least one processor and a memory. The network node includes an interface for receiving an indication of unavailability of an AN-GW. An AN-GW status maintainer implemented by the at least one processor maintains, in the memory, a node-level AN-GW status indicator indicating availability or unavailability of the AN-GW and setting the node-level AN-GW status indicator to unavailable in response to receiving the indication of unavailability of the AN-GW. An AN-GW status checker implemented by the at least one processor checks status of the AN-GW using the node-level AN-GW status indicator and suppresses, based on the status of the AN-GW determined from the node-level AN-GW status indicator, messaging for plural sessions involving the AN-GW.

According to another aspect, the subject matter described herein includes a method for suppressing message flooding during AN-GW unavailability and/or after AN-GW restoration. The method includes, at a network node including at least one processor and a memory, receiving an indication of unavailability of an AN-GW. The method further includes maintaining, in the memory, a node-level AN-GW status indicator indicating availability or unavailability of the AN-GW and setting the node-level AN-GW status indicator to unavailable in response to receiving the indication of unavailability of the AN-GW. The method further includes checking status of the AN-GW using the node-level AN-GW status indicator. The method further includes suppressing, based on the status of the AN-GW determined from the node-level AN-GW status indicator, messaging for plural sessions involving the AN-GW.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
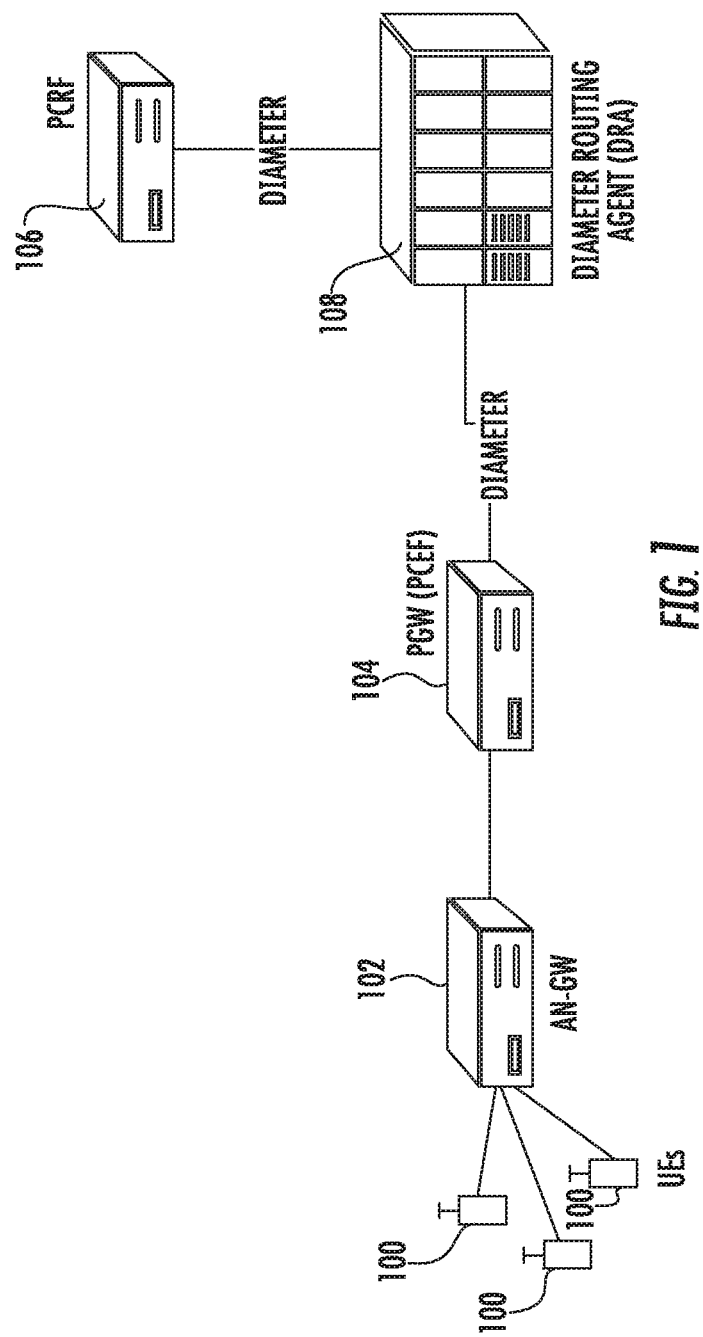
FIG. 1 is a network diagram illustrating an exemplary operating environment for the subject matter described herein.

FIG. 1 is a network diagram illustrating an exemplary operating environment for the subject matter described herein. Referring to FIG. 1, a plurality of user equipment (UEs) 100 establish sessions with a network through an AN-GW 102. AN-GW 102 may handle hundreds or even thousands of user sessions at any given time. A PGW or PCEF 104 (hereinafter, PCEF 104) functions as an intermediary between AN-GW 102 and a PCRF 106. PCRF 106 performs policy and charging functions for user sessions with the network.

When AN-GW 102 becomes unavailable (e.g., due to operational failure or loss of network connectivity), messages from other network nodes, such as PCEF 104 and PCRF 106, can flood the network because messaging is sent on a per-session basis and the only state information regarding AN-GW 102 maintained by PCRF 106 or PCEF 104 is per-session state. As a result, AN-GW unavailability is detected for one session, and that unavailability is not communicated to other sessions. Similarly, when an AN-GW is restored, the restoration is not communicated across all sessions associated with the AN-GW.

In FIG. 1, a DRA 108 is responsible for routing Diameter messaging in the network. Because DRA 108 routes Diameter messages between PCEF 104 and PCRF 106, DRA 108 can likewise become overloaded due to message flooding that occurs when AN-GW 102 fails.

Existing Solution for Handling AN-GW Failure

According to Third Generation Partnership Project (3GPP) Technical Specification (TS) 29.212 v13.5.0 (2016-04), the disclosure of which is incorporated herein by reference in its entirety, an event trigger attribute value pair (AVP) may include an AN_GW_CHANGE code. This value is used in credit control authorization (CCA) and reauthorization request (RAR) commands by the PCRF to indicate that upon the change of the serving access node-gateway, policy and charging control (PCC) rules shall be requested. When used in a credit control request (CCR) command, the AN_GW_CHANGE code indicates that the PCEF generated the request because the serving access node-gateway changed. The address of the new serving access node-gateway is indicated in the AN-GW-Address AVP.

The AN-GW-Address AVP (AVP code 1050) is of type address and contains the control plane Internet protocol version 4 (IPv4) or Internet protocol version 6 (IPv6) addresses of the access node-gateway. An access node-gateway may be a signaling gateway (SGW) for 3GPP networks or an access gateway/evolved packet data gateway (AGW/ePDG) for non-3GPP networks.

The AN_GW_STATUS AVP (AVP code 211) is of type enumerated. It is sent from the PCEF to the PCRF to indicate the status of the AN-GW to the SGW. One status value that is defined is AN_GW_FAILED, which indicates that the AN-GW has failed and that the PCRF should refrain from sending policy decisions to the PCEF until the PCRF is notified that the AN-GW has recovered.

One problem with the AN_GW_STATUS AVP is that it is only a session based parameter. There is no node-level indicator that indicates that an AN-GW is down. Accordingly, if the AN_GW_STATUS AVP is supported, messaging must be exchanged between the PCEF and the PCRF for each session formerly handled by the unavailable AN-GW in order for the unavailable state of the AN-GW to be known for each session. This can result in hundreds or even thousands of messages exchanged between the PCRF and the PCEF. A similar problem occurs from the PCEF to the PCRF when the AN-GW recovers. That is, messages will need to be sent for each session for which failure has been notified when the AN-GW recovers. Such messaging is undesirable as it floods the network with unnecessary per-session signaling involving the unavailable or restored AN-GW.

Proposed Solution

According to an aspect of the subject matter described herein, an AN-GW status indicator may be set on PCEF 104, DRA 108, and/or PCRF 106 if any associated AN-GW becomes unavailable. The setting of the AN-GW status indicator may indicate that an AN-GW is unavailable. The AN-GW status indicator may be reset once all of the associated AN-GWs are restored or become available. The AN-GW status indicator may be a node-level indicator, meaning that once a node, such as PCEF 104, DRA 108, or PCRF 106, is notified that the AN-GW status indicator has been set, that node will suppress session based signaling for all sessions involving the unavailable AN-GW.

In addition to maintaining the AN-GW status indicator at the PCEF 104, DRA 108, and PCRF 106, AN-GW restore data may also be maintained at the PCEF 104, DRA 108, and PCRF 106. The AN-GW restore data may include an AN_G-W_DOWN_IP data structure which maintains the IP address of the AN-GWs which are down. The AN_GW_DOWN_IP data structure may be populated on PCEF 104, DRA 108, and PCRF 106 and identifies which AN-GWs are down. The AN-GW restore data may also include an AN_GW_DOWN_ACK parameter that is set on PCEF 104 and DRA 108 after receiving a successful response from PCRF 106 for the request carrying an AN-GW status AVP as AN_GW_FAIL (zero) for the corresponding AN-GW. The AN-GW restore data may also include an AN_GW_RESTORED_IP parameter. This parameter may store the restored AN-GW IP address on PCEF 104, DRA 108, and PCRF 106.

Figure 2A:
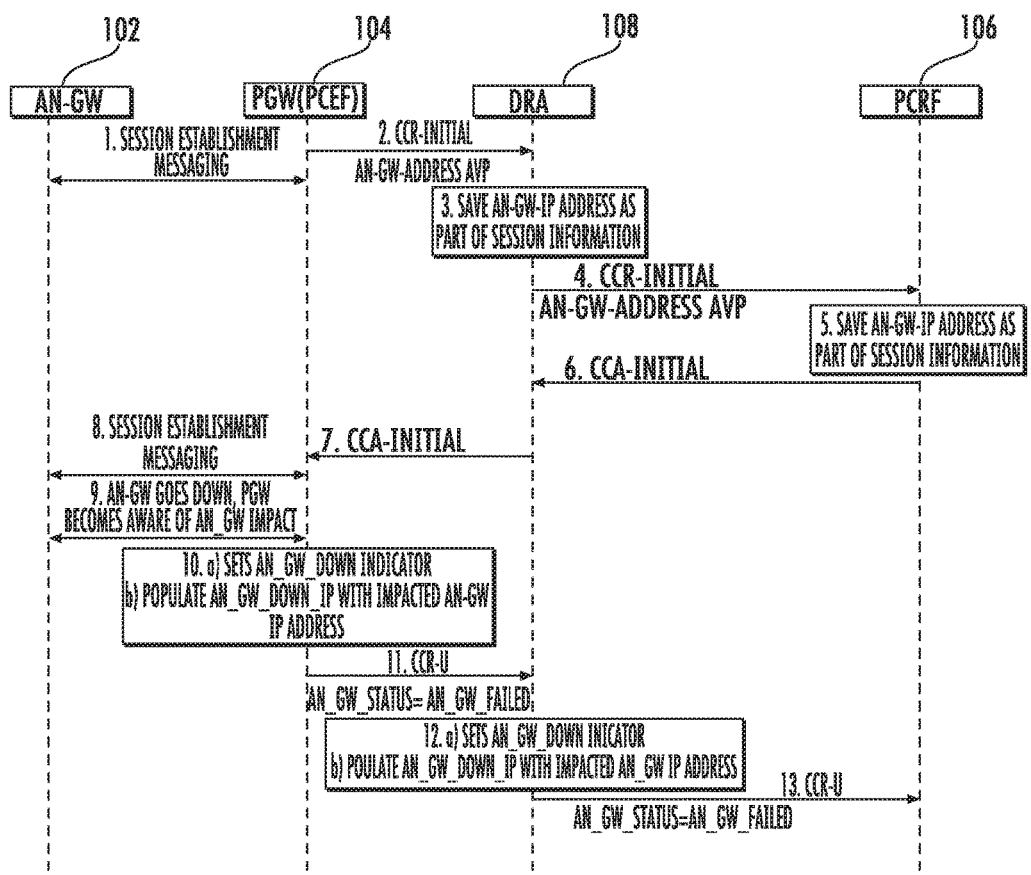
FIGS. 2A and 2B are a message flow diagram illustrating suppression of message flooding using a node-level AN-GW status indicator according to an aspect of the subject matter described herein.
Figure 2B:
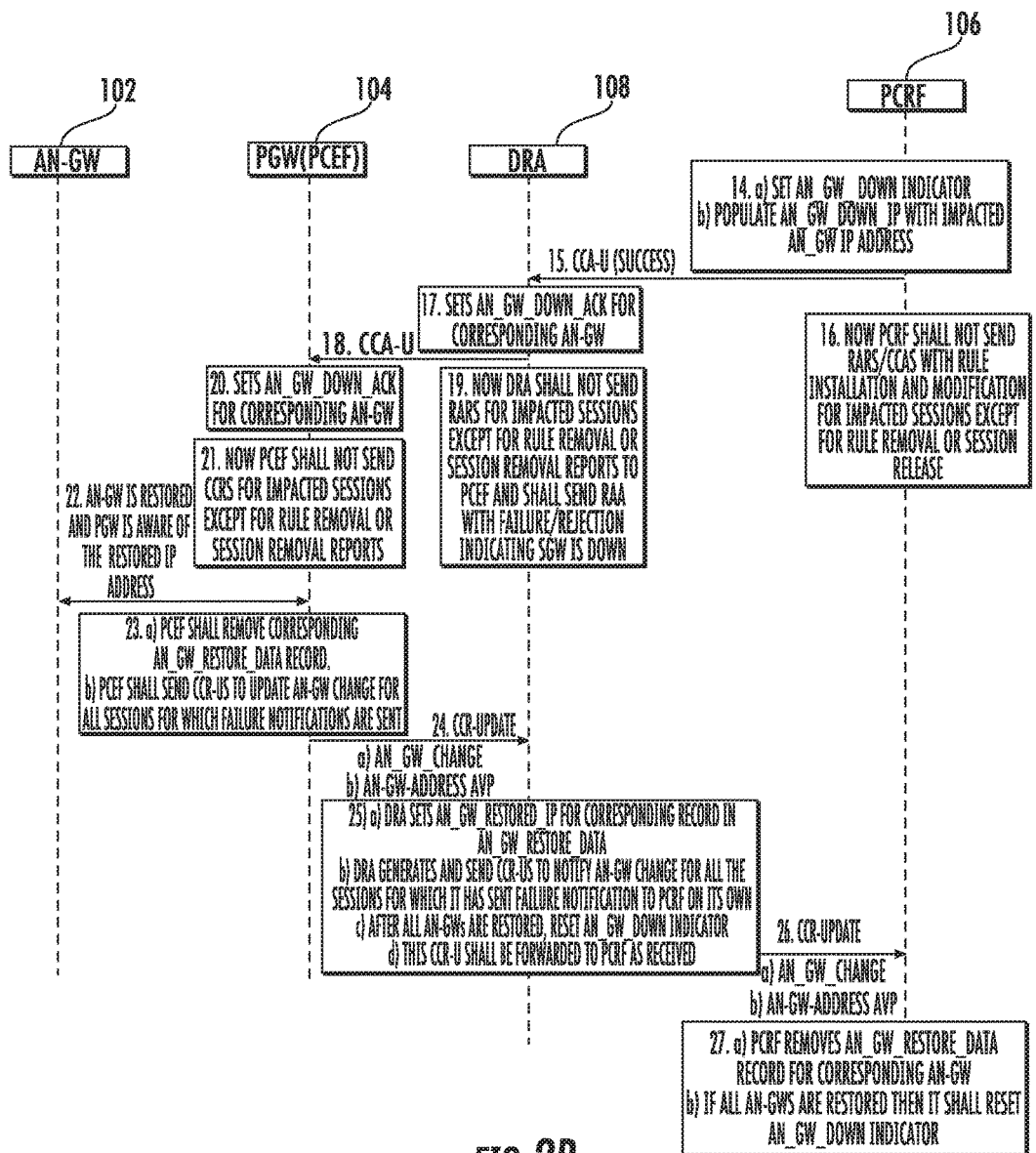

In one aspect of the subject matter described herein, in-session messaging may be used to communicate the indication of AN-GW unavailability among PCEF 104, PCRF 106, and DRA 108. FIGS. 2A and 2B illustrate a message flow diagram illustrating suppression of message flooding using an AN-GW status indicator according to an aspect of the subject matter described herein. Referring to FIG. 2A, in line 1, session establishment signaling is exchanged between AN-GW 102 and PCEF 104. The session establishment signaling may be exchanged for each session involving a UE (not shown in FIGS. 2A and 2B) establishing a session with the network. In line 2, PCEF 104 sends a credit control request-initial (CCR-I) message with an AN-GW address AVP to DRA 108. In line 3, DRA 108 stores the AN-GW IP address as part of session information for the session involving the CCR-I message. In line 4, DRA 108 sends a CCR-initial message to PCRF 106. The CCR-initial message includes the AN-GW address AVP, which contains the IP address of AN-GW 102. In line 5, PCRF 106 saves the AN-GW IP address as part of session information for the session involving the CCR-I message. In line 6, PCRF 106 sends a credit control answer-initial (CCA-I) message to DRA 108. In line 7, DRA 108 sends a CCA-I message to PCEF 104. In line 8, AN-GW 102 and PCEF 104 exchange additional session establishment messaging to establish the session. The process illustrated in lines 1-8 may occur for each session involving AN-GW 102.

In line 9, AN-GW 102 becomes unavailable, and PCEF 104 becomes aware of the unavailability of AN-GW 102. In one example, PCEF 104 may detect the unavailability of AN-GW 102 by expiration of a Diameter watching timer or a session-based message timer. In line 10 of the message flow diagram, PCEF 104 sets the AN-GW status indicator to indicate that AN-GW 102 is unavailable. In line 10, the AN-GW status indicator is illustrated as AN_GW_Down. Also in line 10, PCEF 104 populates the AN_GW_DOWN_IP data structure with the IP address of the unavailable AN-GW. It should be noted that the AN-GW status indicator is a node-level parameter maintained by PCEF 104, rather than a session-based parameter. PCEF 104 will also store the IP address of the unavailable AN-GW in the AN_GW_DOWN_IP data structure.

In line 11 of the message flow diagram, PCEF 104 sends a credit control request-update (CCR-U) message to DRA 108. The CCR-U message includes an AN_GW_STATUS parameter indicating that the AN-GW is unavailable. In line 12 of the message flow diagram, DRA 108 sets the AN-GW status indicator indicating unavailability of AN-GW 102. DRA 108 also populates the AN_GW_Down_IP data structure with the IP address of the impacted AN-GW 102.

In line 13 of the message flow diagram, DRA 108 sends a CCR-U message to PCRF 106. The CCR-U message includes an AN_GW_STATUS parameter indicating that the AN-GW 102 is unavailable. In line 14, PCRF 106 sets the AN-GW status indicator and populates the AN_GW_DOWN_IP data structure with the IP address of AN-GW 102. In line 15 of the message flow diagram, PCRF 106 sends a credit control acknowledgement-update (CCA-U) message indicating successful setting of the AN-GW status indicator. In line 16 of the message flow diagram, once PCRF 106 has successfully set the AN-GW down acknowledgment parameter, PCRF 106 suppresses sending of session-based messaging involving the unavailable AN-GW 102. For example, PCRF 106 may refrain from sending reauthorization requests (RARs) and credit control acknowledgements (CCAs) with rule installation and modification for sessions impacted by unavailability of AN-GW 102. One exception may be rules for removing or releasing sessions.

In line 17, DRA 108 sets an AN-GW unavailability acknowledgement parameter for AN-GW 102. In line 18, DRA 108 sends a CCA-U message to PCEF 104 indicating successful setting of the AN-GW unavailability acknowledgment parameter. In line 19 of the message flow diagram, once DRA 108 has set the AN-GW unavailability acknowledgment parameter, DRA 108 suppresses session based messaging for sessions impacted by the failure of AN-GW 102. For example, DRA 108 may suppress sending of RARs for impacted sessions except for messages involving rule removal or session removal reports to PCEF 104. DRA 108 may also send a reauthorization acknowledgement (RAA) with a failure or rejection code indicating that AN-GW 102 is down.

In line 20 of the message flow diagram, after receiving the CCA-U message from DRA 108, in line 20, PCEF 104 sets the AN-GW unavailability acknowledgment parameter, and, in line 21, suppresses sending of CCRs for impacted sessions except for rule removal or session removal reports.

In line 22 of the message flow diagram, AN-GW 102 is restored or becomes available, and PCEF 104 becomes aware of the availability, including the restored IP address. In line 23, PCEF 104 removes the AN_GW_RESTORE_DATA record and sends, in the best case scenario (explained below), a single CCR-U message to communicate the AN-GW restoration data for all sessions for which failure notifications are sent. One example of such a message is illustrated in line 24 where PCEF 104 sends a CCR-U message to DRA 108. The CCR-U message includes an AN_GW_CHANGE parameter indicating AN-GW restoration as well as the AN-GW-Address AVP.

The solution in FIGS. 2A and 2B after AN-GW restoration can be contrasted with the existing solution. In the existing solution, CCR-Us will be sent individually for each session for which AN-GW failure has been notified, even after receiving notification from the PCRF that AN-GW restoration has been successfully communicated to the PCRF for some of the sessions. In the proposed solution, PCEF 104 sends CCR-Us to PCRF 106 (and hopefully only a single CCR-U) only until PCEF 104 receives confirmation that PCRF 106 has been successfully notified that the AN-GW has been restored for one of the sessions. Once PCEF 104 receives from PCRF 106 a CCA-U with success for the CCR-U communicating the restoration, PCEF 104 does not need to send additional messaging to PCRF 106 to notify to PCRF 106 for the remaining sessions involving the restored AN-GW. For example, if PCRF 106 receives a message indicating recovery of AN-GW for session #1, PCRF 106 interprets AN-GW restoration information from the message received for session #1 to apply to all sessions involving the restored AN-GW. In the best case scenario, PCEF 104 would send a single message indicating AN-GW restoration for session #1, apply the restoration information on PCEF 104 to all sessions by not sending such notifications. PCRF 106 would also apply the restoration information received for session #1 and update AN-GW status to restored for all sessions associated with the restored AN-GW. However, the subject matter described herein is not limited to suppressing all messaging associated with a restored AN-GW. For example, PCEF 104 may send AN-GW restoration information to PCRF 106 for each session involving the restored AN-GW until a response indicating successful updating of the AN-GW status is received from PCRF 106 for one of the sessions. When PCEF 104 receives such a response, PCEF 104 may suppress sending restoration notifications for any remaining sessions for which restoration has not been individually communicated to PCRF 106.

Returning to FIG. 2B, in line 25 of the message flow diagram, DRA 108 sets an AN_GW_RESTORED_IP parameter for the corresponding record for the AN-GW restore data. DRA 108 also generates and sends CCR-Us to notify PCRF 106 for all sessions for which DRA 108 sent AN-GW failure notification to PCRF 106 on its own. After all of the AN-GWs are available or restored, DRA 108 resets the AN-GW status indicator. In line 26, DRA 108 sends the CCR-U message to PCRF 106 as the message was received. The CCR-U message includes the AN_GW_Change attribute indicating restoration of AN-GW 102 and the IP address of the restored AN-GW. In line 27 of the message flow diagram, PCRF 106 removes the AN-GW restore data record for the corresponding restored AN-GW 102. If all of the AN-GWs are restored, PCRF 106 resets the AN-GW status indicator.

Thus, using the messaging illustrated in FIGS. 2A and 2B, much of the session based signaling, such as CCRs, RARs, and CCAs transmitted between PCEF 104 and PCRF 106 is suppressed. The use of a node-level AN-GW status indicator in each of PCEF 104, DRA 108, and PCRF 106 ensures the maximum message suppression. However, the subject matter described herein is not limited to using the AN-GW status indicator among each of PCEF 104, DRA 108, and PCRF 106. Using the AN-GW status indicator at any one or more of these nodes is intended to be within the scope of the subject matter described herein.

Figure 3:
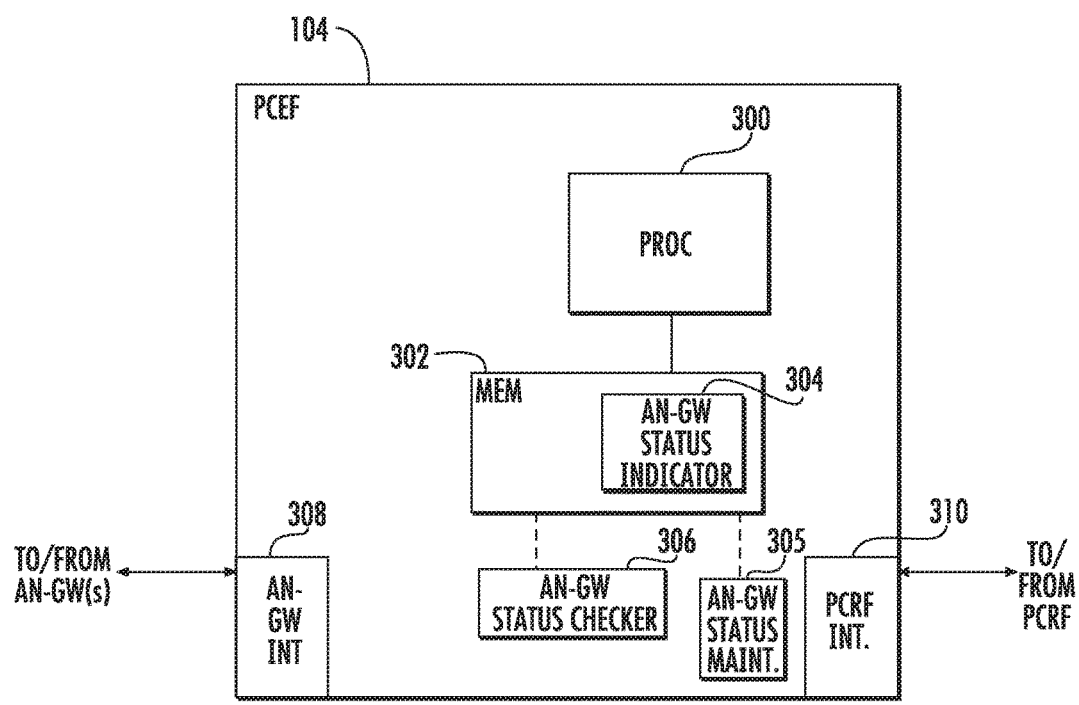
FIG. 3 is a block diagram illustrating an exemplary PCEF that utilizes a node-level AN-GW status indicator to suppress message flooding during AN-GW unavailability and after AN-GW restoration according to an aspect of the subject matter described herein.

As stated above, one of the nodes that may be modified to support the AN-GW status indicator is PCEF 104. FIG. 3 is a block diagram illustrating an exemplary PCEF that utilizes a node-level AN-GW status indicator according to an aspect of the subject matter described herein. Referring to FIG. 3, PCEF 104 includes a processor 300 and a memory 302. Memory 302 includes an AN-GW status indicator 304 that is a node-level indicator that indicates unavailability of one or more AN-GWs. PCEF 104 further includes an AN-GW status maintainer 305 that maintains status indicator in memory 302. PCRF 106 also includes an AN-GW status checker 306 that checks the status of the AN-GW using AN-GW status indicator 304. PCEF 104 further includes an AN-GW interface 308 that communicates with one or more AN-GWs and a PCRF interface 310 that communicates with one or more PCRFs.

Figure 4A:
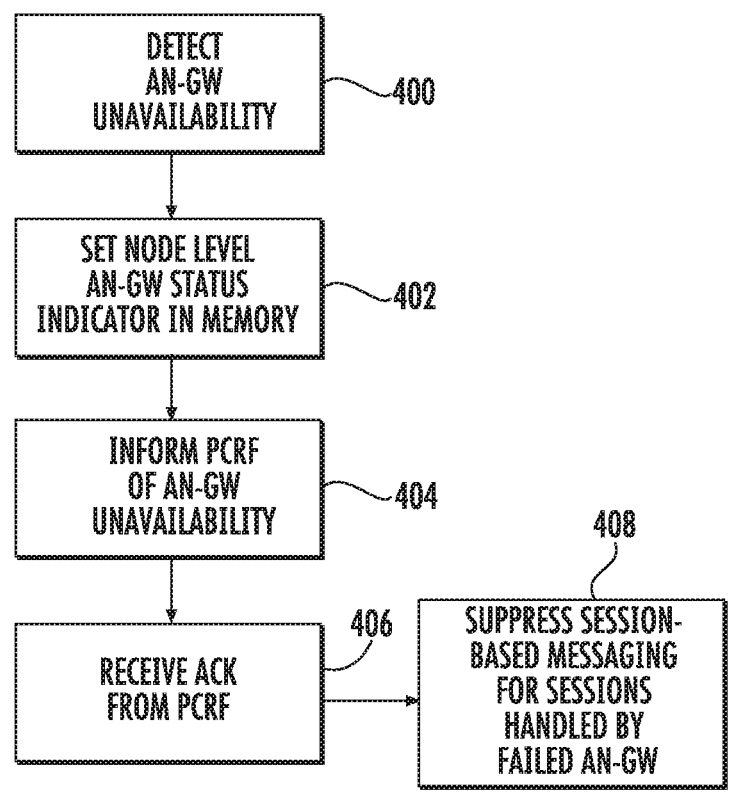
FIG. 4A is a flow chart illustrating exemplary operations performed by the PCEF illustrated in FIG. 3 to suppress message flooding during AN-GW unavailability according to an aspect of the subject matter described herein.

FIG. 4A is a flow chart illustrating exemplary steps performed by PCEF 104 using the AN-GW status indicator to suppress message flooding during AN-GW unavailability and after restoration. Referring to FIG. 4A, in step 400, PCEF 104 detects AN-GW unavailability. In one example, PCEF 104 may detect that the AN-GW is unavailable because the AN-GW fails to respond to a heartbeat or other message, such as an in-session message. In step 402, PCEF 104 sets the node-level AN-GW status indicator in its memory. In step 404, PCEF 104 informs PCRF 106 of the AN-GW unavailability. If session-based messaging is used to communicate the unavailability status to PCRF 106, PCEF may transmit a CCR-U message to PCRF 106 indicating unavailability of the AN-GW and the IP address of the unavailable AN-GW. Until a CCA-U message is received from PCRF 106 indicating success for the CCR-U, PCEF 104 may keep sending CCR-Us with the AN_GW_STATUS AVP as AN_GW_FAILED for sessions triggering the CCR-U.

In step 406, PCEF 104 receives an acknowledgement from PCRF 106. In this example, the acknowledgement is a CCA-U message indicating successful setting of the AN-GW status indicator to unavailable by PCRF 106. In step 408, after receiving the acknowledgement, PCEF 104 suppresses sending of session-based messaging for sessions handled by the failed AN-GW. Suppressing session-based messages may include suppressing or stopping the sending of CCRs to report AN-GW failure for impacted sessions of the unavailable AN-GW. PCEF 104 may trigger CCR-Us with rule removals or session release reports along with AN_GW_FAILED status as per existing PCEF functionality. If PCEF 104 receives any CCA-Us or RARs containing anything but rule removals or session release, PCEF 104 may reject the specific operations but honor rule removals or session release as per existing PCEF functionality.

Figure 4B:
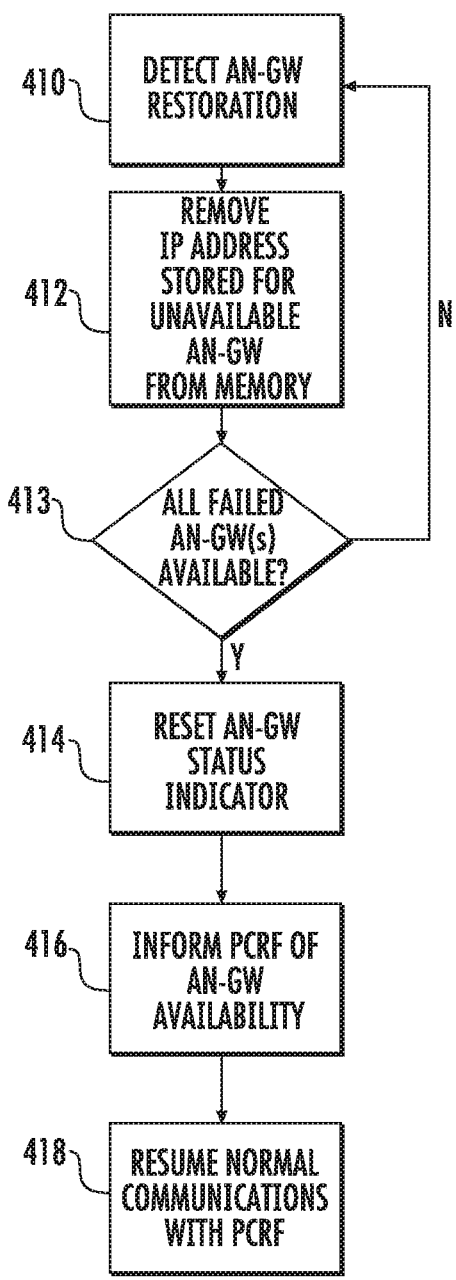
FIG. 4B is a flow chart illustrating exemplary operations performed by the PCEF of FIG. 3 to suppress message flooding after AN-GW restoration according to an aspect of the subject matter described herein.

FIG. 4B illustrates operations performed by PCEF 104 in response to detecting AN-GW restoration. Referring to FIG. 4B, in step 410, PCEF 104 detects AN-GW restoration. In step 412, PCEF 104 removes the unavailable AN-GW IP address from its memory. In step 413, PCEF 104 determines whether all of the failed AN-GWs are available. If all of the failed AN-GWs are not available, control returns to steps 410 and 412 where PCEF 104 waits for more restorations. In step 413, if all AN-GWs are determined to be available, control proceeds to step 414 where the AN-GW status indicator is reset. In step 416, PCEF 104 informs PCRF 106 of the AN-GW availability. In one example, the PCEF 104 may send a CCR-U message with an event trigger AVP set to AN_GW_Change and includes AN_GW_Address AVP to notify PCRF 106 that the AN-GW has been restored for all sessions for which failure was notified. In step 418, PCEF 104 resumes normal communications with PCRF 106. Resuming normal communications may include forwarding session based messaging between AN-GW 102 and PCRF 106.

Figure 5:
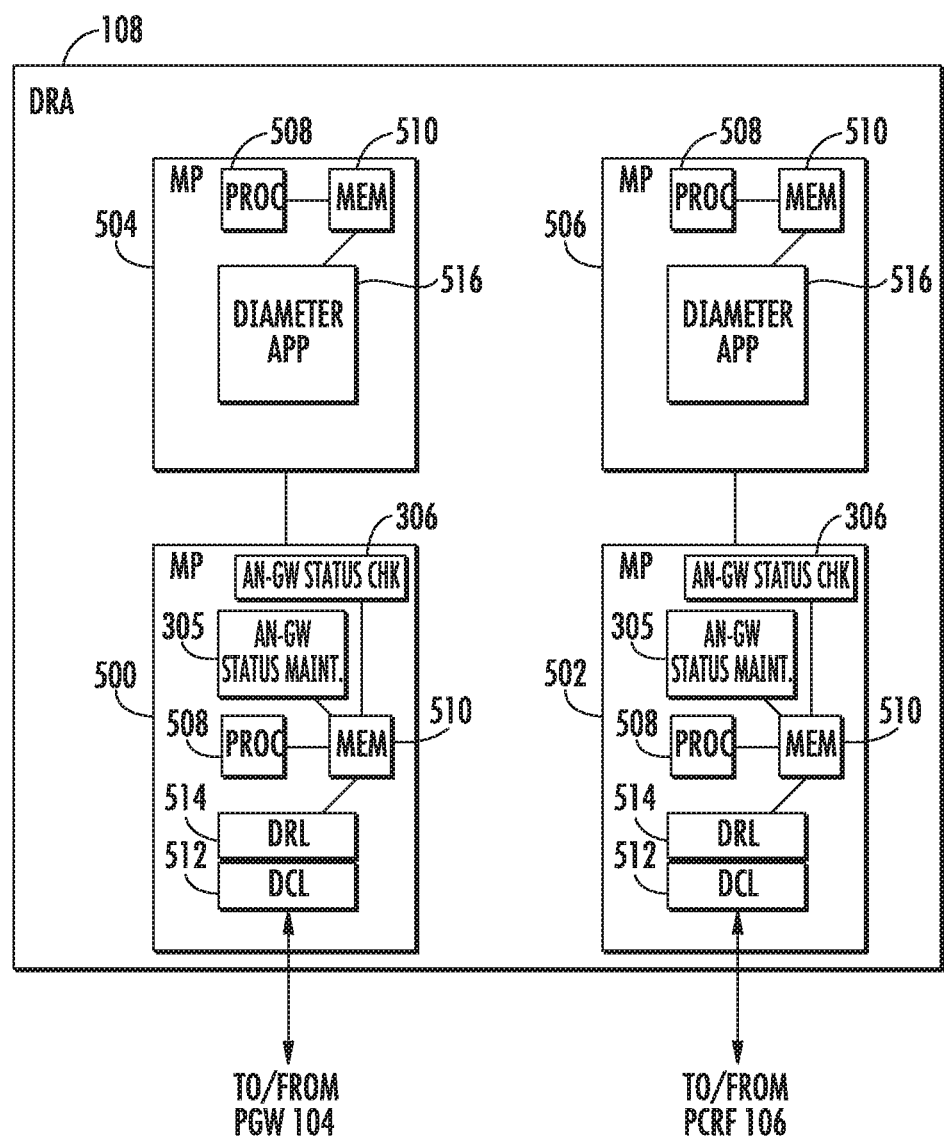
FIG. 5 is a block diagram illustrating an exemplary Diameter routing agent (DRA) for using a node-level AN-GW status indicator to suppress message flooding during AN-GW unavailability and after AN-GW restoration according to an aspect of the subject matter described herein.

As indicated above, another node that may support message flooding suppression during AN-GW unavailability and after restoration is a Diameter routing agent. FIG. 5 is a block diagram of a Diameter routing agent with message flood suppression capability. Referring to FIG. 5, DRA 108 includes a plurality of message processors 500, 502, 504, and 506. Message processors 500, 502, 504, and 506 may each comprise a printed circuit board or blade in a computing platform. Each message processor 500, 502, 504, and 506 includes a processor 508 and a memory 510. In the illustrated example, message processors 500 and 502 each include a Diameter connection layer (DCL) 512 and a Diameter routing layer (DRL) 514. DCL 512 may perform Diameter connection layer processing operations with external nodes. Such operations may include establishing and maintaining Diameter level connections with the external nodes. DRL 514 routes Diameter signaling messages based on Diameter routing information in the messages. Message processors 504 and 506 may include one or more Diameter applications 516. Examples of Diameter applications that may be implemented in DRA 108 include database related applications, such as home subscriber server (HSS) address resolution, equipment identity register (EIR), or other applications.

Message processors 500 and 502 each include AN-GW status maintainer 305 that maintains AN-GW status indicator 304 (not shown in FIG. 5) in memory of message processors 500 and 502. Message processors 500 and 502 also include AN-GW status checker 306 that checks the status of one or more AN-GWs using the node-level AN-GW status indicator maintained in memory 510 and suppresses messaging during AN-GW unavailability and after restoration.

Figure 6A:
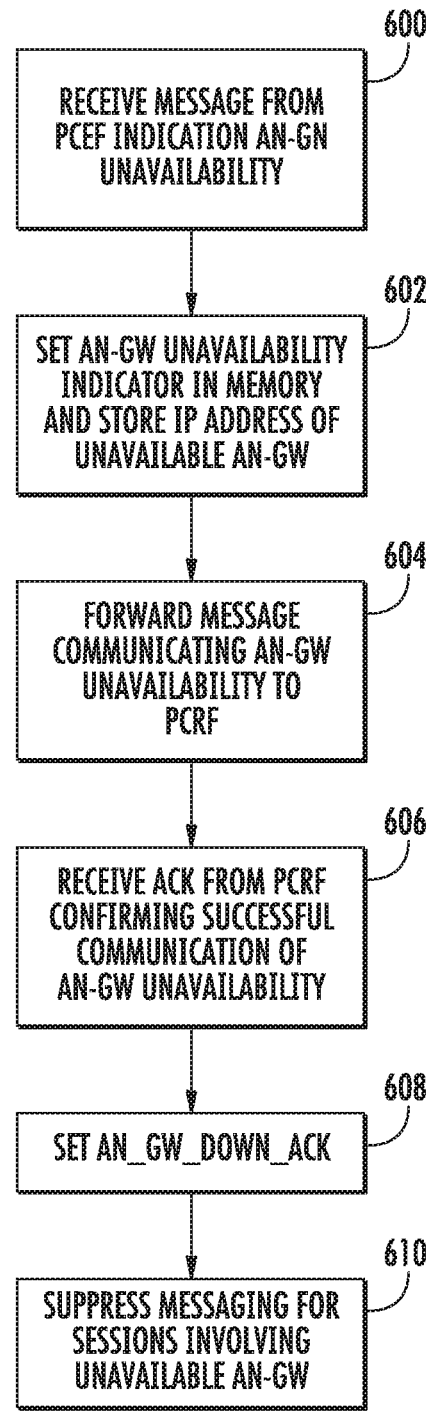
FIG. 6A is a flow chart illustrating exemplary operations performed by the DRA in FIG. 5 for suppressing message flooding during AN-GW unavailability according to an aspect of the subject matter described herein.

FIG. 6A is a flow chart illustrating exemplary steps performed by DRA 108 in suppressing messaging using the node-level AN-GW status indicator. Referring to FIG. 6A, in step 600, DRA 108 receives from PCEF 104 an indication of AN-GW unavailability. In one example, the message from PCEF 104 may be a CCR-U message with a status indicating failure or unavailability of the AN-GW. In step 602, DRA 108 sets the AN-GW status indicator in memory and stores the IP address of the unavailable AN-GW. In step 604, DRA 108 forwards a message communicating the AN-GW unavailability to PCRF 106. In one example, the message may be a CCR-U message. Until a CCA-U message is received from the PCRF indicating success of the CCR-U, DRA 108 may continue to forward CCR-Us of impacted sessions to PCRF 106.

In step 606, DRA 108 receives an acknowledgement from PCRF 106 confirming successful setting of the AN-GW status indicator by PCRF 106. In step 608, DRA 108 sets the AN_GW_DOWN_ACK that acknowledges the successful setting of the AN-GW status indicator by PCRF 106. If the AN-GW is down and AN_GW_DOWN_ACK is set, in step 610, DRA 108 suppresses messaging for sessions involving the unavailable AN-GW. Suppressing messages may include, if the DRA receives a RAR message from PCRF 106 for any session associated with the impacted AN-GW, then DRA 108 may not forward the message to PCEF 104 and may respond to PCRF 106 with a failure/rejection message. Suppressing the messaging may also include, if DRA 108 receives a CCR-U for the impacted session, then DRA 108 may respond with a failure/rejection. DRA 108 may continue to forward messaging associated with rule removal or session release between PCRF 106 and PCEF 104 as per existing AN-GW restoration functionality.

Figure 6B:
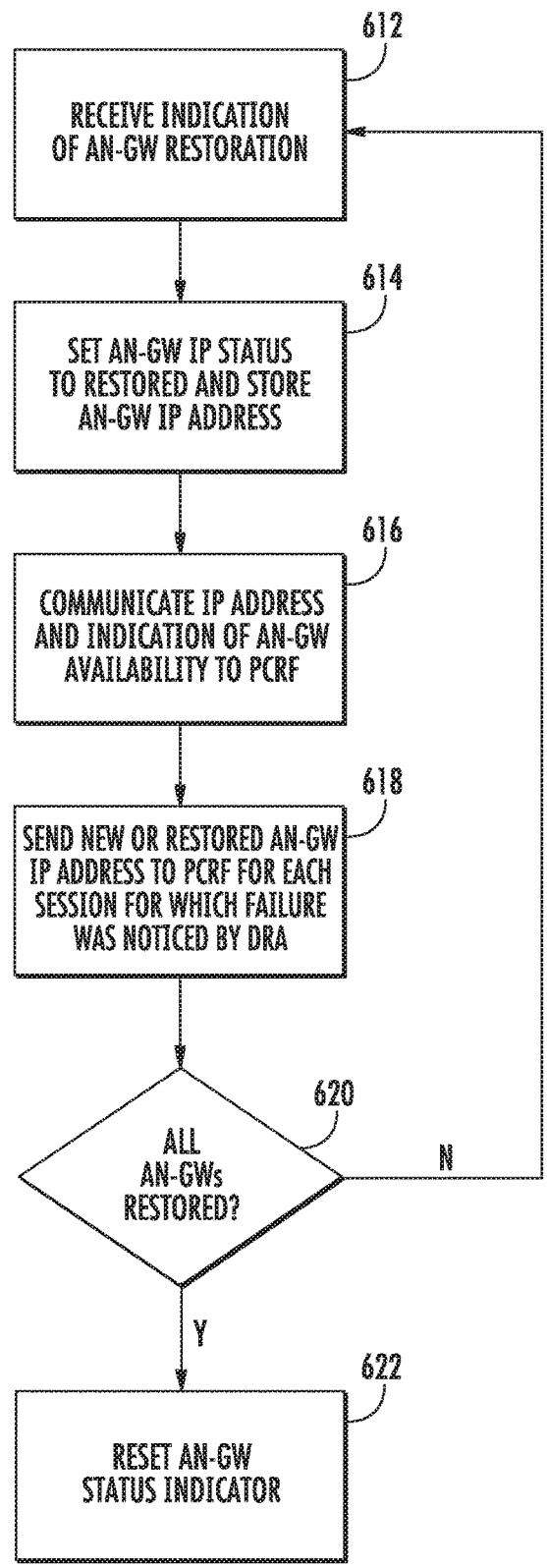
FIG. 6B is a flow chart illustrating exemplary operations performed by the DRA of FIG. 5 for suppressing message flooding after AN-GW restoration according to an aspect of the subject matter described herein.

FIG. 6B illustrates exemplary steps performed by DRA 108 after receiving an indication that a previously unavailable AN-GW is now available. Referring to FIG. 6B, in step 612, DRA 108 receives an indication of restoration of AN-GW 102. In one example, the indication of restoration may be received in a CCR-U message from PCEF 104 with an AN-GW IP address indicating that AN-GW 102 is available. In step 614, DRA 108 sets the AN-GW IP status indicator to restored and stores the IP address of the restored AN-GW. In step 616, DRA 108 communicates the IP address and the indication of AN-GW availability to PCRF 106. The communication may be effected using the CCR-U message with an event trigger AVP set to AN_GW_Change and includes the AN-GW-Address AVP to communicate the restored or new AN-GW IP address to PCRF 106. If the AN-GW-Restored-IP variable is set, in step 618, DRA 108 sends the new or restored AN-GW IP address to PCRF 106 for each session for which failure was noticed by DRA 108. In step 620, DRA 108 determines whether all of the unavailable or failed AN-GWs have been restored. If the all of the unavailable AN-GWs have not been restored, control returns to step 612 where DRA 108 continues to wait for information regarding restoration of any of the unavailable AN-GWs. If all of the AN-GWs have been restored, control proceeds to step 622 where the DRA 108 resets the AN-GW status indicator.

Figure 7:
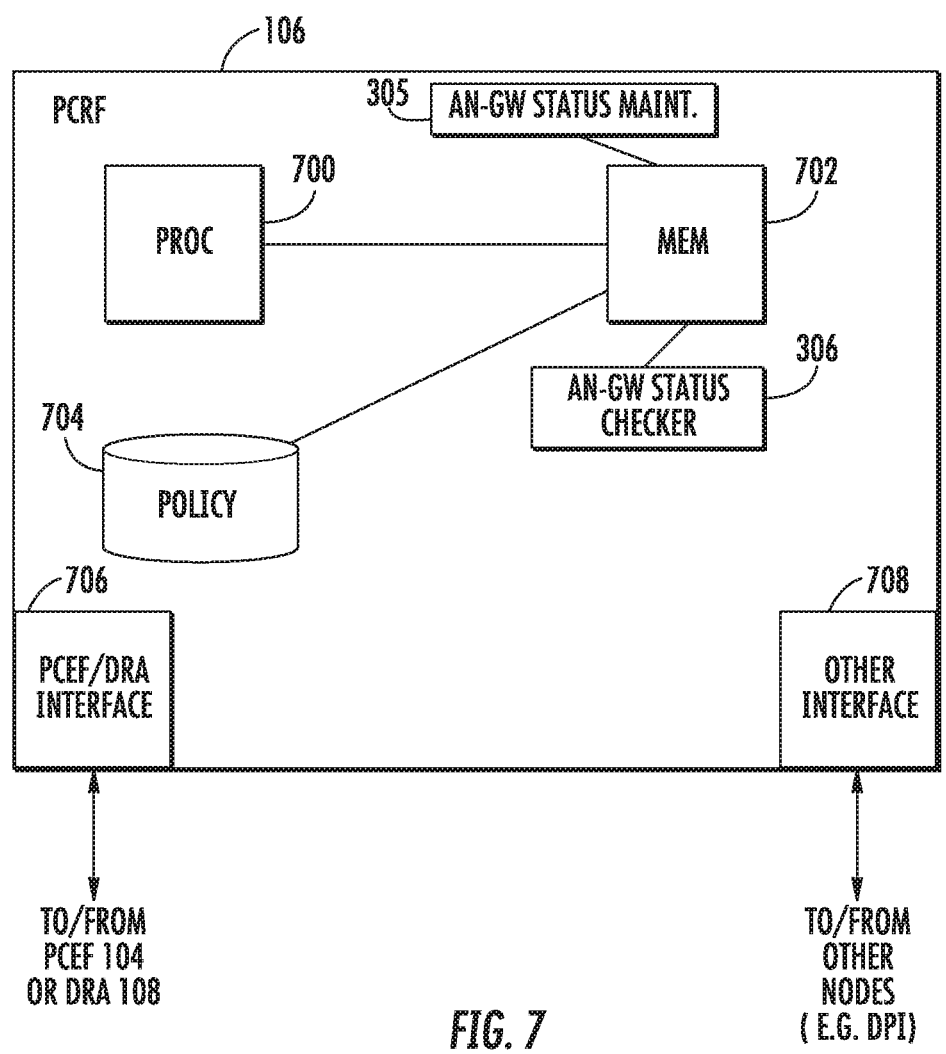
FIG. 7 is a block diagram illustrating an exemplary PCRF for suppressing message flooding during AN-GW unavailability and after AN-GW restoration according to an aspect of the subject matter described herein.

According to another aspect of the subject matter described herein, PCRF 106 may also suppress per-session messaging using an AN-GW status indicator as described above. FIG. 7 is a block diagram illustrating PCRF 106 that uses the AN-GW status indicator to suppress session-based messaging during AN-GW availability and after AN-GW restoration according to an aspect of the subject matter described herein. Referring to FIG. 7, PCRF 106 includes a processor 700, a memory 702, and a policy database 704. Policy database 704 may store network access and charging policies for user elements. When a new session is requested, PCRF 106 may access policy database 704 to determine the network access and usage policies applied to the session. PCRF 106 also includes a PCEF/DRA interface 706 for communicating with PCEF 104 and/or DRA 108. PCRF 106 may also include other interfaces 708 for interfacing with other nodes, such as deep packet inspection nodes.

In the illustrated example, PCRF 106 also includes AN-GW status maintainer 305 that maintains the AN-GW status indicator and related information in memory 702. PCRF 106 also includes AN-GW status checker 306 that checks the status of the AN-GW status indicator and suppresses per-session messaging during AN-GW unavailability and after restoration.

Figure 8A:
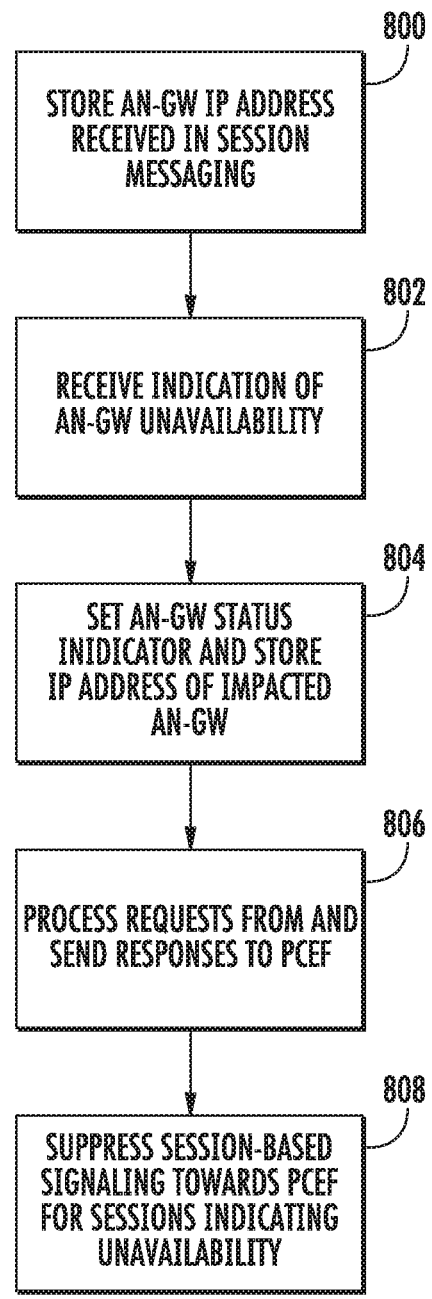
FIG. 8A is a flow chart illustrating exemplary operations performed by the PCRF in FIG. 7 for suppressing message flooding during AN-GW unavailability according to an aspect of the subject matter described herein.

FIG. 8A illustrates exemplary steps performed by PCRF 106 using the AN-GW status indicator to suppress messaging involving an unavailable AN-GW. Referring to FIG. 8A, in step 800, PCRF 106 stores the AN-GW IP address received in session based messaging. The messaging may be CCR messages and context may be maintained for each session with the contexts includes the AN-GW IP address. In step 802, PCRF 106 receives an indication of AN-GW unavailability. The indication may be received in a CCR-U message with an AN-GW status AVP indicating that the AN-GW has failed. In response to receiving the message, in step 804, PCRF 106 sets the AN-GW status indicator and stores the IP address of the impacted AN-GW in memory of PCRF 106.

In step 806, PCRF 106 continues to process requests and send responses to PCEF 104. However, if any of the requests or responses correspond to the unavailable AN-GW, in step 808, PCRF 106 suppresses such signaling. The procedure for suppressing such messages may be as follows. If the AN-GW status indicator is set and the IP address associated with the indicator matches the IP address in-session-based messaging received from PCEF 104, RAR messages are not sent to PCEF 104. In addition, CCA-U messages are not sent to PCEF 104 with rule installations or modifications, as such messages would result in failure.

Figure 8B:
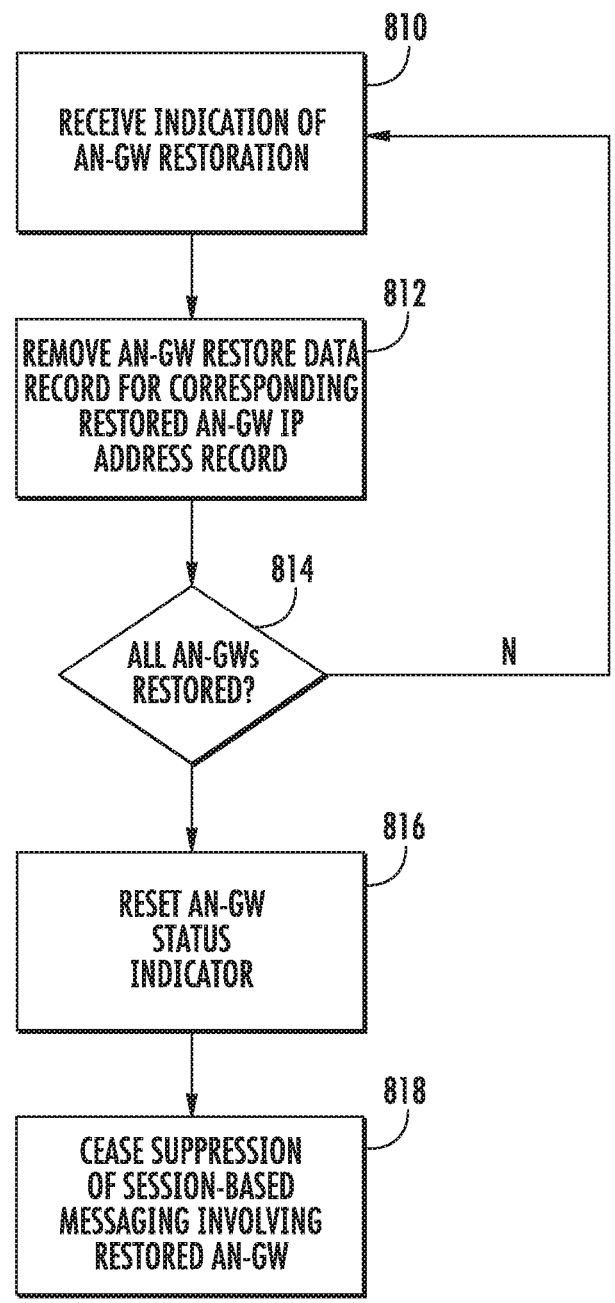
FIG. 8B is a flow chart illustrating exemplary operations performed by the PCRF in FIG. 7 for suppressing message flooding after AN-GW restoration according to an aspect of the subject matter described herein.

FIG. 8B illustrates exemplary steps performed by PCRF 106 in response to AN-GW restoration. Referring to FIG. 8B, in step 810, PCRF 106 receives an indication of AN-GW restoration. The indication may be received in CCR-U message from PCEF 104 indicating that the AN-GW is available with a restored AN-GW IP address. In step 812, in response to receiving the indication of restoration, PCRF 106 removes the AN-GW restore data record for the corresponding restored AN-GW IP address record. In step 814, PCRF 106 determines whether all AN-GWs that have active sessions for which PCRF 106 supplied policy rules have been restored. If all AN-GWs have not been restored, control returns to step 810 where PCRF 106 waits for more restoration messaging. If all AN-GWs have been restored, control proceeds to step 816 where PCRF 106 resets the AN-GW status indicator. In step 818, PCRF 106 ceases suppression of session-based messaging involving the restored AN-GW.

Using Network Management Messaging in Diameter to Communicate AN-GW Unavailability In the examples described above with regard to FIGS. 3 through 8B, in-session messaging is used to communicate AN-GW unavailability information among PCEF 104, DRA 108, and PCRF 106. In an alternate implementation, Diameter network management messaging or other messaging may be used to communicate this information. For example, when AN-GW 102 is unavailable, instead of relying on an in-session CCR message, a new Diameter network management message may indicate that the AN-GW is down along with the IP address of the unavailable AN-GW. When AN-GW 102 becomes available, instead relying on an in-session CCR message, a new Diameter network management message may indicate AN-GW 102 is restored along with the restored AN-GW IP address. The Diameter network management message that is used may be a new message, i.e., one not currently specified in the Diameter standards, or a currently supported message, such as echo request-response, or other Diameter network management message.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A network node for suppressing message flooding during access node-gateway (AN-GW) unavailability and/or after AN-GW restoration, the network node comprising:
   at least one processor and a memory;
   a first interface for receiving an indication of unavailability of an AN-GW;
   an AN-GW status maintainer implemented by the at least one processor for maintaining, in the memory, a node-level AN-GW status indicator indicating availability or unavailability of the AN-GW and setting the node-level AN-GW status indicator to unavailable in response to receiving the indication of unavailability of the AN-GW; and
   an AN-GW status checker implemented by the at least one processor for checking status of the AN-GW using the node-level AN-GW status indicator and suppressing, based on the status of the AN-GW determined from the node-level AN-GW status indicator, messaging for plural sessions involving the AN-GW, wherein the network node comprises a policy and charging enforcement function (PCEF), wherein the AN-GW status checker suppresses messaging towards a policy and charging rules function (PCRF) for the sessions involving the AN-GW, and wherein the PCEF receives an indication of restoration of the AN-GW, resets the AN-GW status indicator to indicate availability of the AN-GW, informs the PCRF of the restoration of the AN-GW, and, after receiving confirmation from the PCRF of successful communication of restoration of the AN-GW to the PCRF, suppresses sending of notification of the restoration of the AN-GW for at least some sessions involving the AN-GW.

2. The network node of claim 1 wherein the network node receives the indication of unavailability of the AN-GW via in-session messaging.

3. The network node of claim 1 wherein the network node receives the indication of unavailability of the AN-GW via a Diameter network management message.

4. The network node of claim 3 wherein the Diameter network management message comprises an echo request message.

5. A method for suppressing message flooding during access node-gateway (AN-GW) unavailability and/or after AN-GW restoration, the method comprising:
   at a network node including at least one processor and a memory:
     receiving an indication of unavailability of an AN-GW;
     maintaining, in the memory, a node-level AN-GW status indicator indicating availability or unavailability of the AN-GW and setting the node-level AN-GW status indicator to unavailable in response to receiving the indication of unavailability of the AN-GW;
     checking status of the AN-GW using the node-level AN-GW status indicator; and
     suppressing, based on the status of the AN-GW determined from the node-level AN-GW status indicator, messaging for plural sessions involving the AN-GW, wherein the network node comprises a policy and charging enforcement function (PCEF), wherein suppressing messaging for plural sessions involving AN-GW includes suppressing messaging towards a policy and charging rules function (PCRF) for the sessions involving the AN-GW, and, further comprising, receiving, by the PCEF, an indication of restoration of the AN-GW, resetting the AN-GW status indicator to indicate availability of the AN-GW, informing PCRF of the restoration of the AN-GW, and, after receiving confirmation from the PCRF of successful communication of restoration of the AN-GW to the PCRF, suppressing sending of notification of the restoration of the AN-GW for at least some sessions involving the AN-GW.

6. The method of claim 5 wherein receiving the indication of unavailability of the AN-GW includes receiving the indication via in-session messaging.

7. The method of claim 5 wherein receiving the indication of unavailability of the AN-GW includes receiving the indication via a Diameter network management message.

8. A non-transitory computer readable medium having stored thereon executable instructions that when executed by a processor of a computer control the computer to perform steps comprising:
   at a network node including at least one processor and a memory:
     receiving an indication of unavailability of an access node-gateway (AN-GW);
     maintaining, in the memory, a node-level AN-GW status indicator indicating availability or unavailability of the AN-GW and setting the node-level AN-GW status indicator to unavailable in response to receiving the indication of unavailability of the AN-GW;
     checking status of the AN-GW using the node-level AN-GW status indicator; and
     suppressing, based on the status of the AN-GW determined from the node-level AN-GW status indicator, messaging for plural sessions involving the AN-GW, wherein the network node comprises a policy and charging enforcement function (PCEF), wherein suppressing messaging for plural sessions involving AN-GW includes suppressing messaging towards a policy and charging rules function (PCRF) for the sessions involving the AN-GW, and, further comprising, receiving, by the PCEF, an indication of restoration of the AN-GW, resetting the AN-GW status indicator to indicate availability of the AN-GW, informing PCRF of the restoration of the AN-GW, and, after receiving confirmation from the PCRF of successful communication of restoration of the AN-GW to the PCRF, suppressing sending of notification of the restoration of the AN-GW for at least some sessions involving the AN-GW.

* * * * *